United States Patent
Li et al.

(10) Patent No.: US 8,064,544 B2
(45) Date of Patent: Nov. 22, 2011

(54) METHOD AND DEVICE FOR RECEIVING OPFDM-DQPSK SIGNAL

(75) Inventors: Liangchuan Li, Shenzhen (CN); Chan Zhao, Shenzhen (CN); Lun Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 260 days.

(21) Appl. No.: 12/613,610

(22) Filed: Nov. 6, 2009

(65) Prior Publication Data

US 2010/0166116 A1  Jul. 1, 2010

(30) Foreign Application Priority Data

Dec. 30, 2008  (CN) .......................... 2008 1 0242163

(51) Int. Cl.
*H04L 27/22* (2006.01)
*H03D 3/22* (2006.01)
(52) U.S. Cl. ........ 375/330; 375/340; 375/283; 398/152; 398/184; 398/205; 398/115; 398/204
(58) Field of Classification Search ............... 375/330, 375/340, 283; 398/152, 184, 205, 115, 204
See application file for complete search history.

(56) References Cited

U.S. PATENT DOCUMENTS

| | | | | |
|---|---|---|---|---|
| 7,609,982 | B2 * | 10/2009 | Ikeuchi | ........................ 398/214 |
| 2006/0013597 | A1 * | 1/2006 | Crivelli et al. | ................ 398/208 |
| 2008/0031633 | A1 | 2/2008 | Hoshida et al. | |
| 2008/0232816 | A1 | 9/2008 | Hoshida et al. | |
| 2009/0142075 | A1 * | 6/2009 | Akiyama et al. | .............. 398/202 |
| 2010/0021166 | A1 * | 1/2010 | Way | ............................... 398/79 |

FOREIGN PATENT DOCUMENTS

WO  WO 03/028252 A1  4/2003

OTHER PUBLICATIONS

European Patent Office, European Search Report for European Application No. 09175229.5 (Feb. 10, 2010).
Zhu of Huawei Technologies Co., Ltd. of P.R. China, "Proposal of OPFDM-RZ-DQPSK 40G Modulation Format Consideration," Study Group: 15, Working Party: 2 (Jun. 23-27, 2008).

* cited by examiner

*Primary Examiner* — Phuong Phu
(74) *Attorney, Agent, or Firm* — Leydig, Voit & Mayer, Ltd.

(57) ABSTRACT

In the field of communication and transmission, a method and a device for receiving an OPFDM-DQPSK signal are provided. The device includes a power splitter, adapted to split the OPFDM-DQPSK signal into two beams of signals; a polarization beam splitter (PBS), adapted to splitting one of the two beams of signals into a first signal and a second signal; a demultiplexer (Demux), adapted to demultiplex the other beam of signal to obtain a third signal and a fourth signal; two delayers, adapted to delay the third signal and the fourth signal respectively; a first frequency-mixing receiving module, adapted to perform frequency-mixing receiving on the first signal and the delayed third signal; a second frequency-mixing receiving module, adapted to perform frequency-mixing receiving on the second signal and the delayed fourth signal; and a decision recovery module, adapted to recover four logical sequences by performing decision on the four electrical signals.

9 Claims, 4 Drawing Sheets

METHOD AND DEVICE FOR RECEIVING OPFDM-DQPSK SIGNAL

CROSS-REFERENCE TO RELATED APPLICATION

This application claims priority to Chinese Patent Application No. 200810242163.5 filed Dec. 30, 2008, the content of which is hereby incorporated by reference in its entirety.

FIELD OF THE TECHNOLOGY

The present invention relates to the field of communications, and more particularly to a method and a device for receiving an orthogonal polarized frequency division multiplexed-differential quadrature phase shift keying (OPFDM-DQPSK) signal.

BACKGROUND OF THE INVENTION

In high-speed optical communication, DQPSK is considered as the most potential modulation format. In the industry, researches on the DQPSK modulation format are competitively performed, and an orthogonal polarized frequency division multiplexed-return to zero-differential quadrature phase shift keying (OPFDM-RZ-DQPSK) modulation format is proposed, which has great tolerance on polarization mode dispersion (PMD), chromatic dispersion (CD), and non-linearity.

FIG. 1 shows a working principle of the OPFDM-RZ-DQPSK modulation format. A frequency of a driving signal of a Mahe-Zender modulator (MZM) is f0, and by setting a bias point and an amplitude of the driving signal of the MZM, a light having a frequency of f emitted from a laser diode (LD) is modulated by the MZM, which outputs two optical sub-carriers SC1 and SC2. Frequencies of the two sub-carriers are respectively fSC1=f+f0 and fSC2=f−f0. Then, the sub-carriers SC1 and SC2 are separated in the frequency domain by a demultiplexer (Demux). An RZ-DQPSK signal is respectively modulated on the sub-carrier SC1 and the sub-carrier SC2, the SC1 RZ-DQPSK signal is kept in an X-polarization state, and the SC2 RZ-DQPSK signal is kept in a Y-polarization state. Finally, the SC1 RZ-DQPSK signal and the SC2 RZ-DQPSK signal are sent to a polarization beam combiner (PBC) for processing to obtain an OPFDM-RZ-DQPSK signal.

In the conventional art, the OPFDM-RZ-DQPSK signal is usually received through delay interference. FIG. 2 shows a device for receiving the OPFDM-RZ-DQPSK signal in the conventional art. Referring to FIG. 2, an OPFDM-RZ-DQPSK signal is received and de-multiplexed by a Demux into an SC1 signal and an SC2 signal. The SC1 signal is split by a coupler into two signals having the same power, and delay demodulation is performed on the two signals respectively by using a Mahe-Zender interferometer (MZI). The SC2 signal is also split by a coupler into two signals having the same power, and delay demodulation is performed on the two signals respectively by using an MZI. Finally, balance detection is performed on each MZI output signal with a detector, so as to obtain an original signal.

During the process of implementing the present invention, the inventor found that in the receiving method of the conventional art, the two sub-carriers are separated in the frequency domain by using the Demux, but it is difficult for the Demux to completely eliminate crosstalk caused by the interaction of the two sub-carriers in the frequency domain, resulting in error recovered data.

SUMMARY OF THE INVENTION

Accordingly, the present invention is directed to a method and a device for receiving an OPFDM-DQPSK signal, so as to solve the problem in the conventional art that crosstalk between adjacent sub-carriers cannot be completely eliminated.

In an embodiment, the present invention provides a device for receiving an OPFDM-DQPSK signal, which includes a power splitter, a polarization beam splitter (PBS), a Demux, a first delayer, a second delayer, a first frequency-mixing receiving module, a second frequency-mixing receiving module, and a decision recovery module.

The power splitter is adapted to split the OPFDM-DQPSK signal into a Signal-1 and a Signal-2 having the same power.

The PBS is adapted to split the Signal-1 into an A(t) signal and a B(t) signal having polarization states orthogonal to each other.

The Demux is adapted to demultiplex the Signal-2 to obtain a C(t) signal and a D(t) signal.

The first delayer is adapted to delay the C(t) signal for a time of one code element T to obtain a C(t-T) signal.

The second delayer is adapted to delay the D(t) signal for a time of one code element T to obtain a D(t-T) signal.

The first frequency-mixing receiving module is adapted to perform frequency-mixing receiving on the A(t) signal and the C(t-T) signal to obtain a first electrical signal and a second electrical signal.

The second frequency-mixing receiving module is adapted to perform frequency-mixing receiving on the B(t) signal and the D(t-T) signal to obtain a third electrical signal and a fourth electrical signal.

The decision recovery module is adapted to recover four logical sequences by performing decision on the first electrical signal, the second electrical signal, the third electrical signal, and the fourth electrical signal respectively.

In an embodiment, the present invention also provides a method for receiving an OPFDM-DQPSK signal, which includes the following steps.

The OPFDM-DQPSK signal is received, and then is split into a Signal-1 and a Signal-2 having the same power.

Polarization splitting is performed on the Signal-1 to obtain an A(t) signal and a B(t) signal having polarization states orthogonal to each other.

The Signal-2 is de-multiplexed to obtain a C(t) signal and a D(t) signal.

The C(t) signal and the D(t) signal are respectively delayed for a time of one code element T to obtain a C(t-T) signal and a D(t-T) signal.

Frequency-mixing-coherence receiving is performed on the A(t) signal and the C(t-T) signal to obtain a first electrical signal and a second electrical signal.

Frequency-mixing-coherence receiving is performed on the B(t) signal and the D(t-T) signal to obtain a third electrical signal and a fourth electrical signal.

Four logical sequences are recovered by performing decision on the first electrical signal, the second electrical signal, the third electrical signal, and the fourth electrical signal respectively.

In the embodiments of the present invention, the PBS performs polarization splitting on the OPFDM-DQPSK signal to obtain two orthogonal polarized signals. The two polarized signals do not have any coherence, and frequencies of the two signals are respectively the same as frequencies of the two sub-carriers in the OPFDM-DQPSK signal. When delay frequency-mixing-coherence is performed on one of the two signals from the Demux and one of the two polarized signals, the problem that the Demux cannot completely eliminate crosstalk between adjacent sub-carriers in actual applications is effectively solved. The adopted decision recovery module includes low-pass filters capable of further eliminating the crosstalk between the adjacent sub-carriers. Through the present invention, the crosstalk between adjacent sub-carriers may be effectively eliminated, and the receiving performances of the device for receiving the OPFDM-DQPSK signal are enhanced, for example, a differential group delay tolerance and a CD dispersion tolerance of the receiving device are greatly improved.

BRIEF DESCRIPTION OF THE DRAWINGS

The accompanying drawings are included to provide a further understanding of the invention, and are incorporated in and constitute a part of this specification instead of limiting the invention, and wherein.

DETAILED DESCRIPTION OF THE EMBODIMENTS

In order to make it easier for persons of ordinary skill in the art to understand and implement the present invention, embodiments of the present invention are described below with reference to the accompanying drawings. Here, the exemplary embodiments of the present invention and descriptions thereof are intended to illustrate the present invention, instead of limiting the present invention.

In the following embodiments, a process of receiving an OPFDM-RZ-DQPSK signal is set as an example for illustration. It should be understood that a process of receiving an OPFDM-NRZ-DQPSK is similar.

Figure 1:
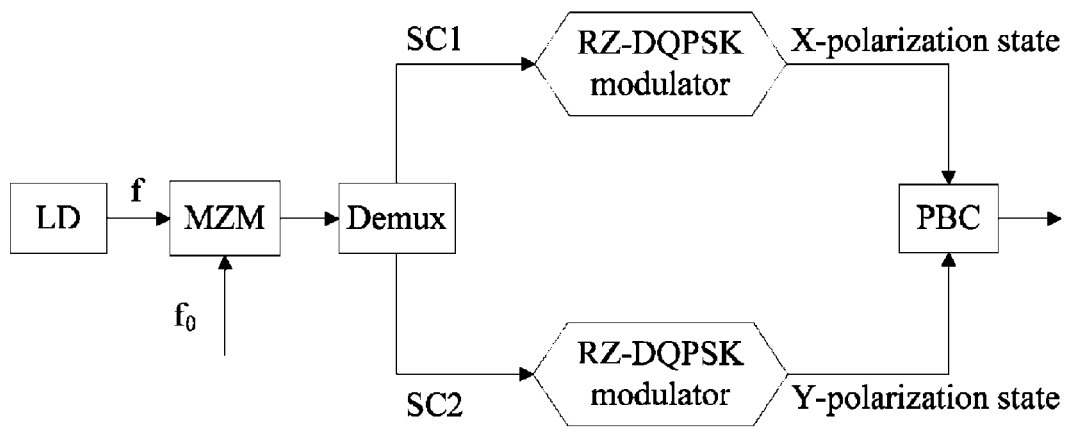
FIG. 1 shows a working principle of an OPFDM-RZ-DQPSK modulation format in the conventional art.
Figure 2:
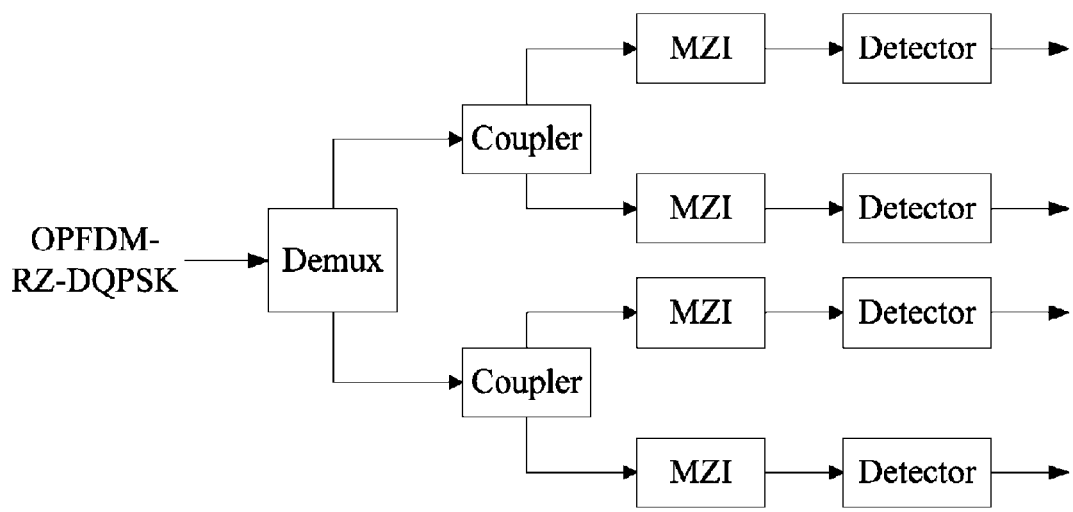
FIG. 2 is a structural view of a device for receiving an OPFDM-RZ-DQPSK signal in the conventional art.
Figure 3:
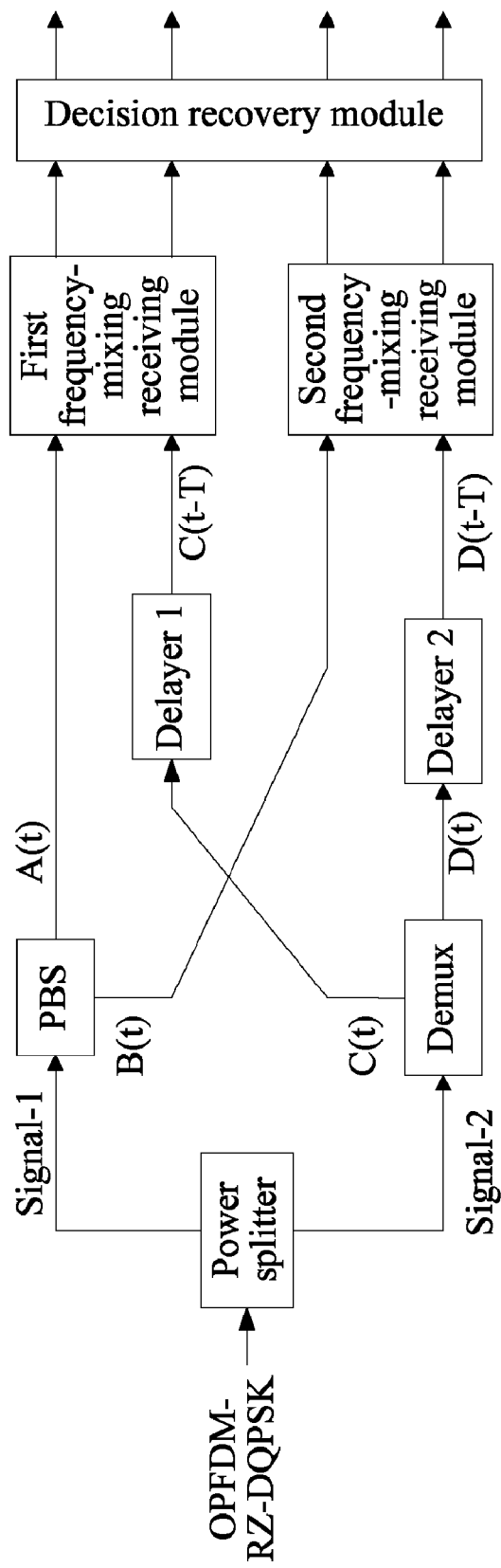
FIG. 3 is a schematic structural view of a device for receiving an OPFDM-DQPSK signal according to an embodiment of the present invention.

FIG. 3 is a schematic structural view of a device for receiving an OPFDM-RZ-DQPSK signal according to an embodiment of the present invention. Referring to FIG. 3, the device includes a power splitter, a PBS, a Demux, a delayer 1, a delayer 2, a first frequency-mixing receiving module, a second frequency-mixing receiving module, and a decision recovery module.

The power splitter is adapted to receive and split the OPFDM-RZ-DQPSK signal into a Signal-1 and a Signal-2 having the same power.

The PBS is adapted to split the Signal-1 into an A(t) signal and a B(t) signal having polarization states orthogonal to each other.

The Demux is adapted to demultiplex the Signal-2 to obtain a C(t) signal and a D(t) signal.

The delayer 1 is adapted to delay the C(t) signal for a time of one code element T to obtain a C(t-T) signal.

The delayer 2 is adapted to delay the D(t) signal for a time of one code element T to obtain a D(t-T) signal.

The first frequency-mixing receiving module is adapted to perform frequency-mixing receiving on the A(t) signal and the C(t-T) signal to obtain a first electrical signal and a second electrical signal.

The second frequency-mixing receiving module is adapted to perform frequency-mixing receiving on the B(t) signal and the D(t-T) signal to obtain a third electrical signal and a fourth electrical signal.

The decision recovery module is adapted to recover four logical sequences by performing decision on the first electrical signal, the second electrical signal, the third electrical signal, and the fourth electrical signal respectively.

The A(t) signal is in an X-polarization state, and the B(t) signal is in a Y-polarization state. The C(t) signal is an SC1 RZ-DQPSK signal in a transmitting end of the OPFDM-RZ-DQPSK signal, and D(t) signal is an SC2 RZ-DQPSK signal in the transmitting end of the OPFDM-RZ-DQPSK signal.

Since the A(t) signal and the B(t) signal are orthogonal to each other, the two signals do not have any coherence, and frequencies thereof are respectively the same as frequencies of the two sub-carriers in the OPFDM-DQPSK signal. When delay frequency-mixing-coherence is performed on one of the two signals from the Demux and one of the two signals from the PBS, the problem that the Demux cannot completely eliminate crosstalk between adjacent sub-carriers in actual applications is effectively solved, and the receiving performances of the device for receiving the OPFDM-DQPSK signal are enhanced, for example, a differential group delay tolerance and a CD dispersion tolerance of the receiving device are greatly improved.

Figure 4:
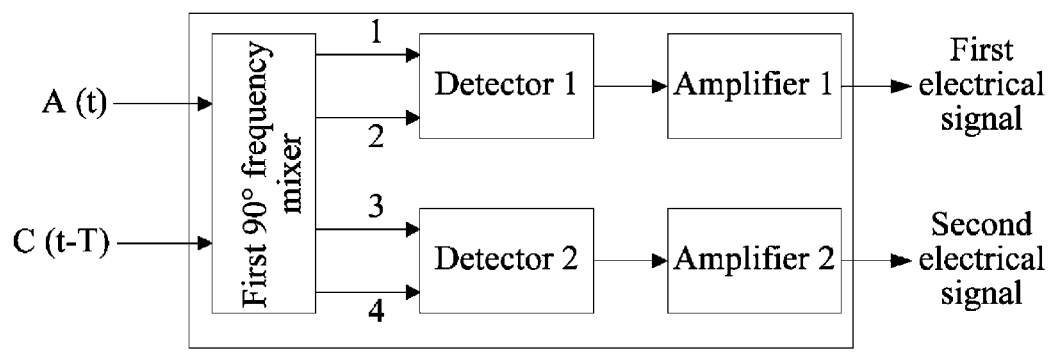
FIG. 4 is a schematic structural view of a first frequency-mixing receiving module according to an embodiment of the present invention.

FIG. 4 is a schematic structural view of the first frequency-mixing receiving module according to an embodiment of the present invention. Referring to FIG. 4, the first frequency-mixing receiving module includes a first 90° frequency mixer, a detector 1, a detector 2, an amplifier 1, and an amplifier 2.

The first 90° frequency mixer is adapted to perform mixing on the A(t) signal and the C(t-T) signal to obtain four signals.

The detector 1 is adapted to perform balanced detection on a first signal and a second signal to obtain an A-electrical signal.

The detector 2 is adapted to perform balanced detection on a third signal and a fourth signal to obtain a B-electrical signal.

The amplifier 1 is adapted to amplify the A-electrical signal to obtain the first electrical signal.

The amplifier 2 is adapted to amplify the B-electrical signal to obtain the second electrical signal.

The first signal is A(t)+C(t-T), the second signal is A(t)−C(t-T), the third signal is A(t)+jC(t-T), and the fourth signal is A(t)−jC(t-T).

Figure 5:
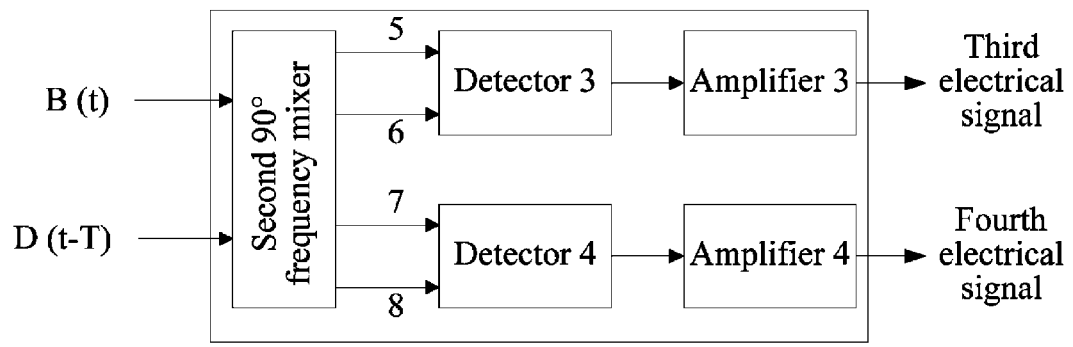
FIG. 5 is a schematic structural view of a second frequency-mixing receiving module according to an embodiment of the present invention.

FIG. 5 is a schematic structural view of the second frequency-mixing receiving module according to an embodiment of the present invention. Referring to FIG. 5, the second frequency-mixing receiving module includes a second 90° frequency mixer, a detector 3, a detector 4, an amplifier 3, and an amplifier 4.

The second 90° frequency mixer is adapted to perform mixing on the B(t) signal and the D(t-T) signal to obtain four signals.

The detector 3 is adapted to perform balanced detection on a fifth signal and a sixth signal to obtain a C-electrical signal.

The detector 4 is adapted to perform balanced detection on a seventh signal and an eighth signal to obtain a D-electrical signal.

The amplifier 3 is adapted to amplify the C-electrical signal to obtain the third electrical signal.

The amplifier 4 is adapted to amplify the D-electrical signal to obtain the fourth electrical signal.

The fifth signal is B(t)+D(t-T), the sixth signal is B(t)−D(t-T), the seventh signal is B(t)+jD(t-T), and the eighth signal is B(t)−jD(t-T) signal.

The detectors in the first frequency-mixing receiving module and the second frequency-mixing receiving module are balanced detectors.

The amplifiers are disposed in the first frequency-mixing receiving module and the second frequency-mixing receiving module to amplify the electrical signals detected by the detectors, thereby ensuring that the subsequent decision recovery can be performed correctly.

Figure 6:
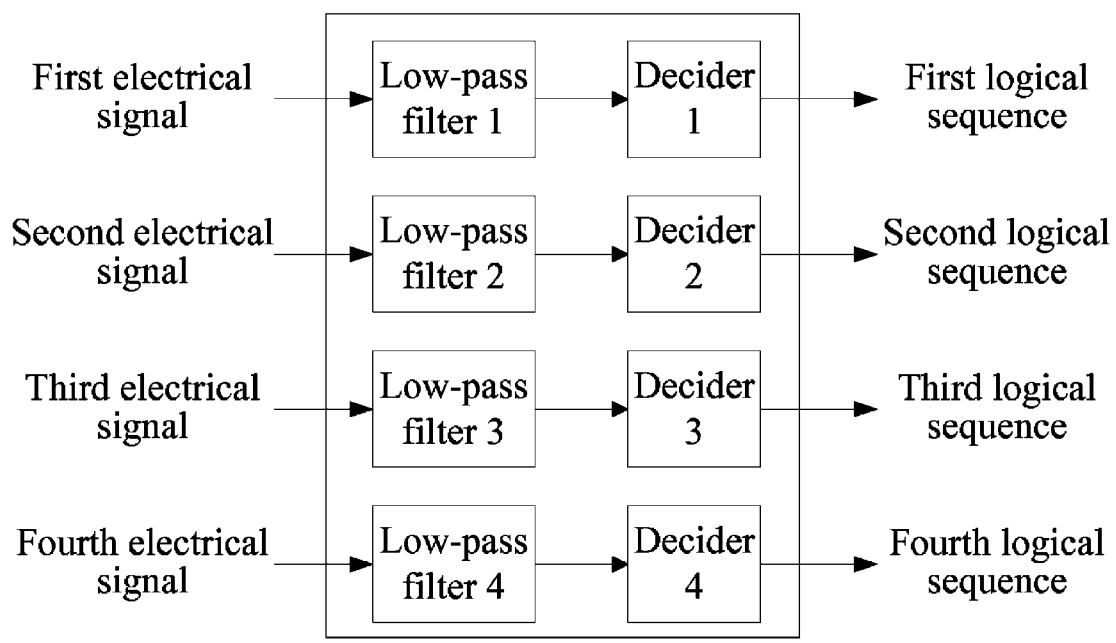
FIG. 6 is a schematic structural view of a decision recovery module according to an embodiment of the present invention.

FIG. 6 is a schematic structural view of the decision recovery module according to an embodiment of the present invention. Referring to FIG. 6, the decision recovery module includes a low-pass filter 1, a low-pass filter 2, a low-pass filter 3, a low-pass filter 4, a decider 1, a decider 2, a decider 3, and a decider 4.

The low-pass filter 1 is adapted to perform low-pass filtering on the first electrical signal to obtain the first electrical signal which has no sub-carrier crosstalk.

The low-pass filter 2 is adapted to perform low-pass filtering on the second electrical signal to obtain the second electrical signal which has no sub-carrier crosstalk.

The low-pass filter 3 is adapted to perform low-pass filtering on the third electrical signal to obtain the third electrical signal which has no sub-carrier crosstalk.

The low-pass filter 4 is adapted to perform low-pass filtering on the fourth electrical signal to obtain the fourth electrical signal which has no sub-carrier crosstalk.

The decider 1 is adapted to perform logical decision on the first electrical signal which has no sub-carrier crosstalk to obtain a first logical sequence.

The decider 2 is adapted to perform logical decision on the second electrical signal which has no sub-carrier crosstalk to obtain a second logical sequence.

The decider 3 is adapted to perform logical decision on the third electrical signal which has no sub-carrier crosstalk to obtain a third logical sequence.

The decider 4 is adapted to perform logical decision on the fourth electrical signal which has no sub-carrier crosstalk to obtain a fourth logical sequence.

3-dB bandwidth of one of the low-pass filter 1, the low-pass filter 2, the low-pass filter 3, and the low-pass filter 4 is smaller than a half of a difference of frequencies between the two sub-carriers at the transmitting end. The module adopts the low-pass filters to filter the crosstalk between the sub-carriers, thereby lowering the probability of false decision.

In an embodiment, the present invention provides a method for receiving an OPFDM-RZ-DQPSK signal, which includes the following steps.

The OPFDM-DQPSK signal is received, and then is split into a Signal-1 and a Signal-2 having the same power.

Polarization splitting is performed on the Signal-1 to obtain an A(t) signal and a B(t) signal having polarization states orthogonal to each other.

The Signal-2 is de-multiplexed to obtain a C(t) signal and a D(t) signal.

The C(t) signal and the D(t) signal are respectively delayed for a time of one code element T to obtain a C(t-T) signal and a D(t-T) signal.

Frequency-mixing-coherence receiving is performed on the A(t) signal and the C(t-T) signal to obtain a first electrical signal and a second electrical signal.

Frequency-mixing-coherence receiving is performed on the B(t) signal and the D(t-T) signal to obtain a third electrical signal and a fourth electrical signal.

Four logical sequences are recovered by performing decision on the first electrical signal, the second electrical signal, the third electrical signal, and the fourth electrical signal respectively.

The A(t) signal is in an X-polarization state, and the B(t) signal is in a Y-polarization state. The C(t) signal is an SC1 RZ-DQPSK signal in a transmitting end of the OPFDM-RZ-DQPSK signal, and D(t) signal is an SC2 RZ-DQPSK signal in the transmitting end of the OPFDM-RZ-DQPSK signal.

Specifically, performing the frequency-mixing-coherence receiving on the A(t) signal and the C(t-T) signal to obtain the first electrical signal and the second electrical signal is implemented as follows.

Frequency-mixing-coherence is performed on the A(t) signal and the C(t-T) signal to obtain an A(t)+C(t-T) signal, an A(t)−C(t-T) signal, an A(t)+jC(t-T) signal, and an A(t)−jC(t-T) signal.

Balanced receiving is performed on the A(t)+C(t-T) signal and the A(t)−C(t-T) signal to obtain an A-electrical signal.

Balanced receiving is performed on the A(t)+jC(t-T) signal and the A(t)−jC(t-T) signal to obtain a B-electrical signal.

The A-electrical signal is amplified to obtain the first electrical signal.

The B-electrical signal is amplified to obtain the second electrical signal.

Specifically, performing the frequency-mixing-coherence receiving on the B(t) signal and the D(t-T) signal to obtain the third electrical signal and the fourth electrical signal is implemented as follows.

Frequency-mixing-coherence is performed on the B(t) signal and the D(t-T) signal to obtain a B(t)+D(t-T) signal, a B(t)−D(t-T) signal, a B(t)+jD(t-T) signal, and a B(t)−jD(t-T) signal.

Balanced receiving is performed on the B(t)+D(t-T) signal and the B(t)−D(t-T) signal to obtain a C-electrical signal.

Balanced receiving is performed on the B(t)+jD(t-T) signal and the B(t)−jD(t-T) signal to obtain a D-electrical signal.

The C-electrical signal is amplified to obtain the third electrical signal.

The D-electrical signal is amplified to obtain the fourth electrical signal.

Specifically, respectively performing the decision recovery on the first electrical signal, the second electrical signal, the third electrical signal, and the fourth electrical signal to obtain the four logical sequences is implemented as follows.

Low-pass filtering is respectively performed on the first electrical signal, the second electrical signal, the third electrical signal, and the fourth electrical signal by using low-pass filters having a 3-dB bandwidth that is smaller than f0.

Logical decision is performed on the four electrical signals after low-pass filtering to obtain the four logical sequences.

f0 is a half of a difference of frequencies between the two sub-carriers at the transmitting end of the OPFDM-RZ-DQPSK signal.

In the receiving method provided by the embodiment of the present invention, the PBS splits the OPFDM-DQPSK signal into two orthogonal polarized signals. The two polarized signals do not have any coherence, and frequencies of the two signals are respectively the same as the frequencies of the two sub-carriers in the OPFDM-DQPSK signal. When delay frequency-mixing-coherence is performed on one of the two signals from the Demux and one of the two polarized signals, the problem that the Demux cannot completely eliminate crosstalk between the adjacent sub-carriers in actual applications is effectively solved. In decision recovery, the low-pass filters are adopted to further eliminate the crosstalk between the adjacent sub-carriers, thereby lowering the probability of false decision. Through the present invention, the crosstalk between adjacent sub-carriers may be effectively eliminated, and the receiving performances of the device for receiving the OPFDM-DQPSK signal are enhanced, for example, a differential group delay tolerance and a CD dispersion tolerance of the receiving device are greatly improved.

Persons skilled in the art may understand that the accompanying drawings are merely schematic views of a preferred embodiment, and the division of the modules of the device in the embodiment is not unique but for ease of illustration only.

The above embodiments are not intended to limit the protection scope of the present invention. It will be apparent to persons skilled in the art that various modifications and variations can be made to the present invention without departing from the scope or spirit of the invention. In view of the foregoing, it is intended that the present invention cover modifications and variations of this invention provided they fall within the scope of the following claims and their equivalents.

What is claimed is:

1. A device for receiving an orthogonal polarized frequency division multiplexed-differential quadrature phase shift keying (OPFDM-DQPSK) signal, comprising:
    a power splitter, adapted to split the OPFDM-DQPSK signal into a Signal-1 and a Signal-2 having the same power;
    a polarization beam splitter (PBS), adapted to split the Signal-1 into an A(t) signal and a B(t) signal having polarization states orthogonal to each other;
    a demultiplexer (Demux), adapted to demultiplex the Signal-2 to obtain a C(t) signal and a D(t) signal;
    a first delayer, adapted to delay the C(t) signal for a time of one code element T to obtain a C(t-T) signal;
    a second delayer, adapted to delay the D(t) signal for a time of one code element T to obtain a D(t-T) signal;
    a first frequency-mixing receiving module, adapted to perform frequency-mixing receiving on the A(t) signal and the C(t-T) signal to obtain a first electrical signal and a second electrical signal;
    a second frequency-mixing receiving module, adapted to perform frequency-mixing receiving on the B(t) signal and the D(t-T) signal to obtain a third electrical signal and a fourth electrical signal; and
    a decision recovery module, adapted to recover four logical sequences by performing decision on the first electrical signal, the second electrical signal, the third electrical signal, and the fourth electrical signal respectively.

2. The device according to claim 1, wherein the first frequency-mixing receiving module comprises:
    a first 90° frequency mixer, adapted to perform mixing on the A(t) signal and the C(t-T) signal to obtain an A(t)+C(t-T) signal, an A(t)−C(t-T) signal, an A(t)+jC(t-T) signal, and an A(t)−jC(t-T) signal;
    a first detector, adapted to perform balanced detection on the A(t)+C(t-T) signal and the A(t)−C(t-T) signal to obtain an A-electrical signal;
    a second detector, adapted to perform balanced detection on the A(t)+jC(t-T) signal and the A(t)−jC(t-T) signal to obtain a B-electrical signal;
    an amplifier 1, adapted to amplify the A-electrical signal to obtain the first electrical signal; and
    an amplifier 2, adapted to amplify the B-electrical signal to obtain the second electrical signal.

3. The device according to claim 1, wherein the second frequency-mixing receiving module comprises:
    a second 90° frequency mixer, adapted to perform mixing on the B(t) signal and the D(t-T) signal to obtain a B(t)+D(t-T) signal, a B(t)−D(t-T) signal, a B(t)+jD(t-T) signal, and a B(t)−jD(t-T) signal;
    a third detector, adapted to perform balanced detection on the B(t)+D(t-T) signal and the B(t)−D(t-T) signal to obtain a C-electrical signal;
    a fourth detector, adapted to perform balanced detection on the B(t)+jD(t-T) signal and the B(t)−jD(t-T) signal to obtain a D-electrical signal;
    an amplifier 3, adapted to amplify the C-electrical signal to obtain the third electrical signal; and
    an amplifier 4, adapted to amplify the D-electrical signal to obtain the fourth electrical signal.

4. The device according to claim 1, wherein the decision recovery module comprises:
    a low-pass filter 1, adapted to filter the first electrical signal to obtain the first electrical signal which has no sub-carrier crosstalk;
    a low-pass filter 2, adapted to filter the second electrical signal to obtain the second electrical signal which has no sub-carrier crosstalk;
    a low-pass filter 3, adapted to filter the third electrical signal to obtain the third electrical signal which has no sub-carrier crosstalk;
    a low-pass filter 4, adapted to filter the fourth electrical signal to obtain the fourth electrical signal which has no sub-carrier crosstalk;
    a decider 1, adapted to perform decision on the first electrical signal which has no sub-carrier crosstalk to obtain a first logical sequence;
    a decider 2, adapted to perform decision on the second electrical signal which has no sub-carrier crosstalk to obtain a second logical sequence;
    a decider 3, adapted to perform decision on the third electrical signal which has no sub-carrier crosstalk to obtain a third logical sequence; and
    a decider 4, adapted to perform decision on the fourth electrical signal which has no sub-carrier crosstalk to obtain a fourth logical sequence.

5. The device according to claim 4, wherein a 3-dB bandwidth of any one of the four low-pass filters in the decision recovery module is smaller than a half of a difference of frequencies between two sub-carriers at a transmitting end.

6. A method for receiving an orthogonal polarized frequency division multiplexed-differential quadrature phase shift keying (OPFDM-DQPSK) signal, comprising:
    receiving the OPFDM-DQPSK signal, and splitting the OPFDM-DQPSK signal into a Signal-1 and a Signal-2 having the same power;
    splitting the Signal-1 into an A(t) signal and a B(t) signal having polarization states orthogonal to each other;
    demultiplexing the Signal-2 to obtain a C(t) signal and a D(t) signal;
    respectively delaying the C(t) signal and the D(t) signal for a time of one code element T to obtain a C(t-T) signal and a D(t-T) signal;
    performing frequency-mixing receiving on the A(t) signal and the C(t-T) signal to obtain a first electrical signal and a second electrical signal;
    performing frequency-mixing receiving on the B(t) signal and the D(t-T) signal to obtain a third electrical signal and a fourth electrical signal; and recovering four logical sequences by performing decision on the first electrical signal, the second electrical signal, the third electrical signal, and the fourth electrical signal respectively.

7. The method according to claim 6, wherein the performing the frequency-mixing-coherence receiving on the A(t) signal and the C(t-T) signal to obtain the first electrical signal and the second electrical signal comprises:

performing frequency-mixing-coherence on the A(t) signal and the C(t-T) signal to obtain an A(t)+C(t-T) signal, an A(t)−C(t-T) signal, an A(t)+jC(t-T) signal, and an A(t)−jC(t-T) signal;

performing balanced detection on the A(t)+C(t-T) signal and the A(t)−C(t-T) signal to obtain an A-electrical signal;

performing balanced detection on the A(t)+jC(t-T) signal and the A(t)−jC(t-T) signal to obtain a B-electrical signal; and amplifying the A-electrical signal and the B-electrical signal to respectively obtain the first electrical signal and the second electrical signal.

8. The method according to claim 6, wherein the performing the frequency-mixing-coherence receiving on the B(t) signal and the D(t-T) signal to obtain the third electrical signal and the fourth electrical signal comprises:

performing frequency-mixing-coherence on the B(t) signal and the D(t-T) signal to obtain a B(t)+D(t-T) signal, a B(t)−D(t-T) signal, a B(t)+jD(t-T) signal, and a B(t)−jD(t-T) signal;

performing balanced detection on the B(t)+D(t-T) signal and the B(t)−D(t-T) signal to obtain a C-electrical signal;

performing balanced detection on the B(t)+jD(t-T) signal and the B(t)−jD(t-T) signal to obtain a D-electrical signal; and amplifying the C-electrical signal and the D-electrical signal respectively to obtain the third electrical signal and the fourth electrical signal.

9. The method according to claim 6, wherein recovering the four logical sequences by performing decision on the first electrical signal, the second electrical signal, the third electrical signal, and the fourth electrical signal respectively comprises:

performing low-pass filtering on the first electrical signal, the second electrical signal, the third electrical signal, and the fourth electrical signal respectively to obtain the first electrical signal which has no sub-carrier crosstalk, the second electrical signal which has no sub-carrier crosstalk, the third electrical signal which has no sub-carrier crosstalk, and the fourth electrical signal which has no sub-carrier crosstalk; and performing decision on the first electrical signal which has no sub-carrier crosstalk, the second electrical signal which has no sub-carrier crosstalk, the third electrical signal which has no sub-carrier crosstalk, and the fourth electrical signal which has no sub-carrier crosstalk respectively to obtain the four logical sequences.

\* \* \* \* \*